United States Patent [19]

Takizawa

[11] Patent Number: 5,463,687
[45] Date of Patent: Oct. 31, 1995

[54] FOLDABLE PORTABLE TELEPHONE WITH CONTROL OF AUDIO CIRCUITRY BASED ON THE FOLDED/UNFOLDED POSITION

[75] Inventor: Hiroshi Takizawa, Tokyo, Japan

[73] Assignee: NEC Corporation, Japan

[21] Appl. No.: 180,214

[22] Filed: Jan. 12, 1994

[30] Foreign Application Priority Data

Jan. 12, 1993 [JP] Japan .................................. 5-002979

[51] Int. Cl.$^6$ .................................................. H04M 1/00
[52] U.S. Cl. ........................................ 379/433; 379/434
[58] Field of Search .................................. 379/433, 434, 379/58, 60, 61

[56] References Cited

U.S. PATENT DOCUMENTS 4,897,873  1/1990  Beutler et al. ......................... 379/433

FOREIGN PATENT DOCUMENTS 473402    8/1991   European Pat. Off. .
2158328  11/1985   United Kingdom .
9107836   5/1991   WIPO .
9217974  10/1992   WIPO .

OTHER PUBLICATIONS

*Patent Abstracts of Japan*, vol. 16, No. 354 (E–1242) Jul. 30, 1992; JP A–04 111 655 (NEC Corporation).

Primary Examiner—Jeffery A. Hofsass
Assistant Examiner—Jack Chiang
Attorney, Agent, or Firm—Ostrolenk, Faber, Gerb & Soffen

[57] ABSTRACT

A portable telephone having a first and a second box-like casing part which are foldably connected by a hinge. The first casing part accommodates at least a display and a speaker while the second casing part accommodates at least a microphone. When the two casing parts are folded, a control circuit interrupts power supply to the display, microphone, and speaker.

2 Claims, 2 Drawing Sheets

FOLDABLE PORTABLE TELEPHONE WITH CONTROL OF AUDIO CIRCUITRY BASED ON THE FOLDED/UNFOLDED POSITION

BACKGROUND OF THE INVENTION

The present invention relates to a foldable portable telephone and, more particularly, to a foldable portable telephone whose operation is adequately controlled on the basis of the folded/unfolded position thereof.

There has been proposed a foldable portable telephone which allows, in a folded position, the user to operate a power switch thereof and see the ON/OFF state of the switch and the reception of a call, as disclosed in Japanese Patent Laid-Open Publication (Kokai) No. 4-11655 by way of example. There has also been proposed a telephone having a cover for protecting a switch section when folded, and a calculator module provided on the cover, as taught in, for example, Japanese Patent Laid-Open Publication No. 4-117848.

However, none of the conventional portable telephones gives consideration to the control over transmission and reception to occur in the folded position. Specifically, howling is apt to occur when a microphone and a speaker built in the telephone are brought close to each other. Moreover, even when the telephone is folded, a display and other devices powered by a battery consume power, reducing the life of the battery.

SUMMARY OF THE INVENTION

It is, therefore, an object of the present invention to provide a foldable portable telephone which eliminates howling when a microphone and a speaker thereof are brought close to each other.

It is another object of the present invention to provide a foldable portable telephone capable of extending the life of a battery incorporated therein.

A foldable portable telephone of the present invention comprises a first box-like casing part accommodating at least a display and a speaker, a second box-like casing part accommodating at least a microphone, a hinge connecting the first and second casing parts foldably to each other, and a control circuit for interrupting, when the first and second casing parts are folded, power supply to the display, microphone, and speaker.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
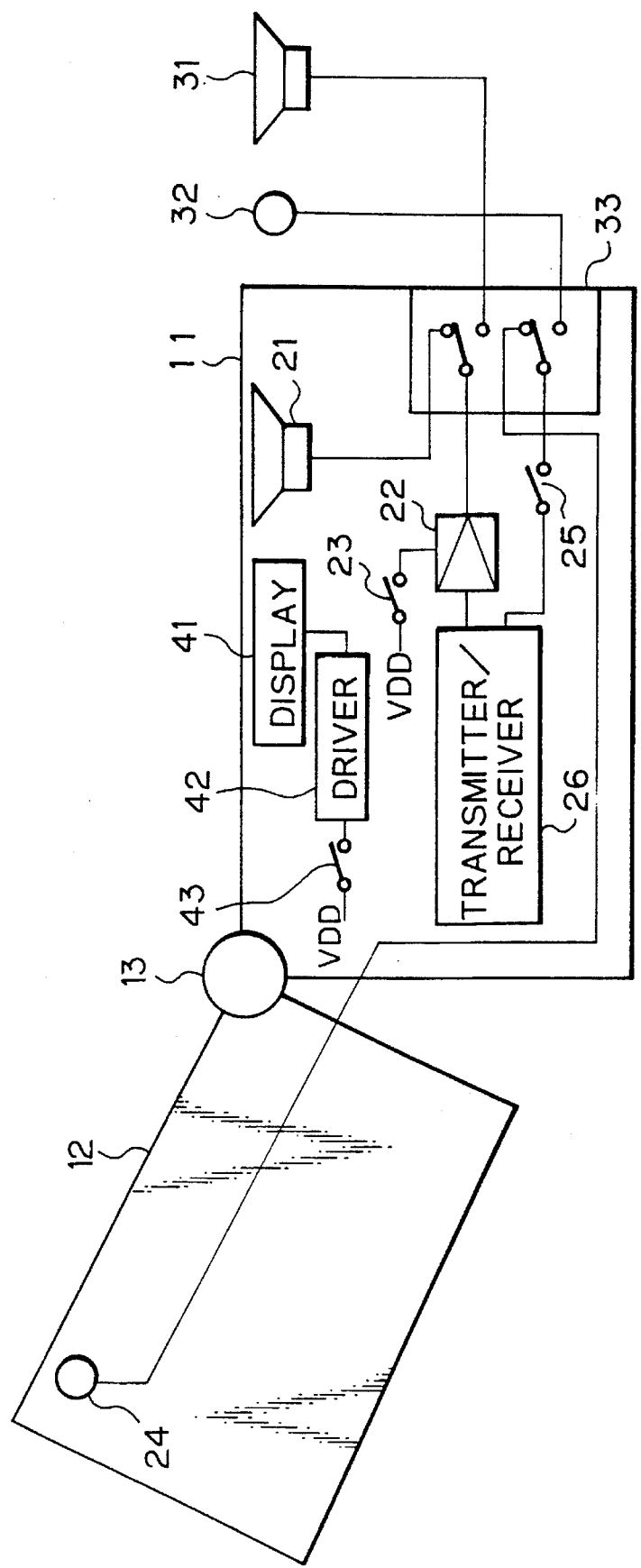
FIG. 1 is a block diagram schematically showing a foldable portable telephone embodying the present invention.

Referring to FIG. 1 of the drawings, a foldable portable telephone embodying the present invention is shown. As shown, the telephone is generally made up of a first and a second box-like member or casing part 11 and 12, respectively. The casing parts 11 and 12 are foldably connected to each other by a hinge 13. A microphone 24 is built in the casing part 12. The casing part 11 accommodates therein a speaker 21, an amplifier 22 for driving the speaker 21, a switch 23 for selectively connecting or disconnecting the speaker 21 to or from a power source VDD, a switch 25 for selectively turning on or turning off the microphone 24, and a transmitter/receiver 26. A jack 33 is provided on the casing part 11 to allow an extra speaker 31 and an extra microphone 32 to be connected to the telephone, as desired. A display 41 is provided on the casing part 11. Also accommodated in the casing part 11 are a driver 42 for driving the display 41, and a switch 43 for selectively connecting or disconnecting the driver 42 to or from the power source VDD. The switches 23, 25 and 43 are controlled on and off by software.

When the built-in speaker 21 and microphone 24 are used, the extra speaker 31 and microphone 32 are not connected to the jack 33. In this case, the jack 33 connects the speaker 21 and microphone 24 to the transmitter/receiver 26. When the casing parts 11 and 12 are rotated away from each other, or opened, about the hinge 13, the switches 23 and 25 are automatically turned on. In this condition, the user of the telephone can hold a conversation via the speaker 21 and microphone 24. When the casing parts 11 and 12 are closed, the switches 23 and 25 are automatically turned off. As a result, when the telephone is folded about the hinge 13, the amplifier 22 is disconnected from the power source VDD while the microphone 24 is turned off. Further, the switch 43 is turned off to disconnect the driver 41 from the power source VDD, whereby the display 41 is also turned off.

Assume that the extra or outside speaker 31 and microphone 32 are connected to the jack 33 of telephone. Then, the jack 33 connects the outside speaker 31 and microphone 32 to the transmitter/receiver 26 in place of the built-in or inside speaker 21 and microphone 24. While a conversation is under way, the switches 23 and 25 are continuously turned on. If the casing parts 11 and 12 are not closed in the event of communication, the switch 43 is turned on to cause the driver 42 to drive the display 41. As a result, a message urging the user to close the casing parts 11 and 12 appears on the display 41. As soon as the user folds up the casing parts 11 and 12, the switch 43 is turned off to shut off the power supply to the display 41 and driver 42.

Figure 2A:
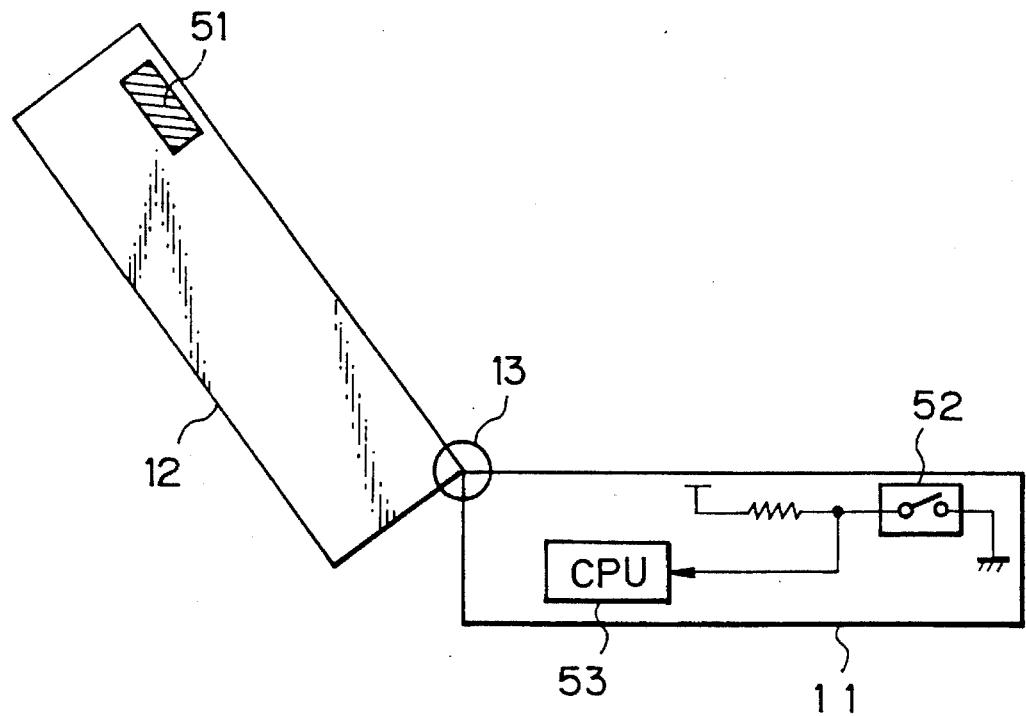
FIGS. 2A and 2B show a specific arrangement for detecting the folded/unfolded position of the telephone shown in FIG. 1.
Figure 2B:
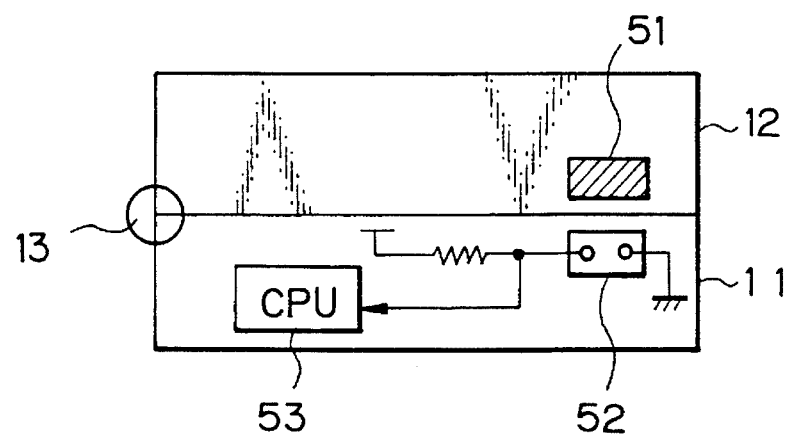

FIGS. 2A and 2B show a specific arrangement for determining whether the casing parts 11 and 12 are open or whether they are closed. As shown, a magnet 51 is affixed to one of the casing parts 11 and 12, e.g., the casing part 12 while a reed switch or similar magnetic detector 52 and a CPU 53 are mounted on the other casing part 11. The CPU 53 determines whether or not the casing parts 11 and 12 are closed in response to the output of the detector 52. Alternatively, a switch, not shown, may be located in the vicinity of the hinge 13 to turn on or turn off when the casing parts 11 and 12 are closed or opened. The telephone is shown in an unfolded position in FIG. 2A and in a folded position in FIG. 2B.

As stated above, when the speaker 21 and microphone 24 built in the telephone are not used, the casing parts 11 and 12 are closed. As a result, the power supply to the transmitter/receiver 26 and amplifier 22 are interrupted. This eliminate howling despite that the speaker 21 and microphone 24 are brought close to each other.

When the outside speaker 31 and microphone 32 are connected to the jack 33, the switches 23 and 25 are turned on. In this condition, the user can hold a conversation on the telephone by folding it up. At this instant, the jack 33 disconnects the inside speaker 21 and microphone 24 from the transmitter/receiver 26, thereby eliminating howling.

Furthermore, when the casing parts 11 and 12 are closed, the power supply to the display 41 is shut off. This is successful in saving power and, therefore, extending the life of a battery incorporated in the telephone.

Various modifications will become possible for those skilled in the art after receiving the teachings of the present disclosure without departing from the scope thereof.

What is claimed is:

1. A foldable portable telephone comprising:

a first box-like casing part accommodating at least a display and a first speaker;

a second box-like casing part accommodating at least a first microphone;

hinge means connecting said first and second casing parts foldably to each other;

detecting means for determining whether or not said first and second casing parts are folded;

switch means for connecting a second speaker and a second microphone to the telephone; and control means for (a) interrupting, when said first and second casing parts are folded or when said second speaker and said second microphone are connected to said telephone, power supply to said first microphone and said first speaker, (b) for providing power supply to said second speaker and said second microphone when said second speaker and said second microphone are connected to said telephone whether or not said first and second casing parts are folded, and (c) for interrupting power supply to said display when said first and second casing parts are folded.

2. A telephone as claimed in claim 1, wherein said detecting means comprises a magnet affixed to one of said first and second casing parts, and a reed switch mounted on the other of said first and second casing parts.

* * * * *